No. 776,650. PATENTED DEC. 6, 1904.
C. E. DURYEA.
PNEUMATIC TIRE.
APPLICATION FILED JAN. 16, 1904.
NO MODEL.
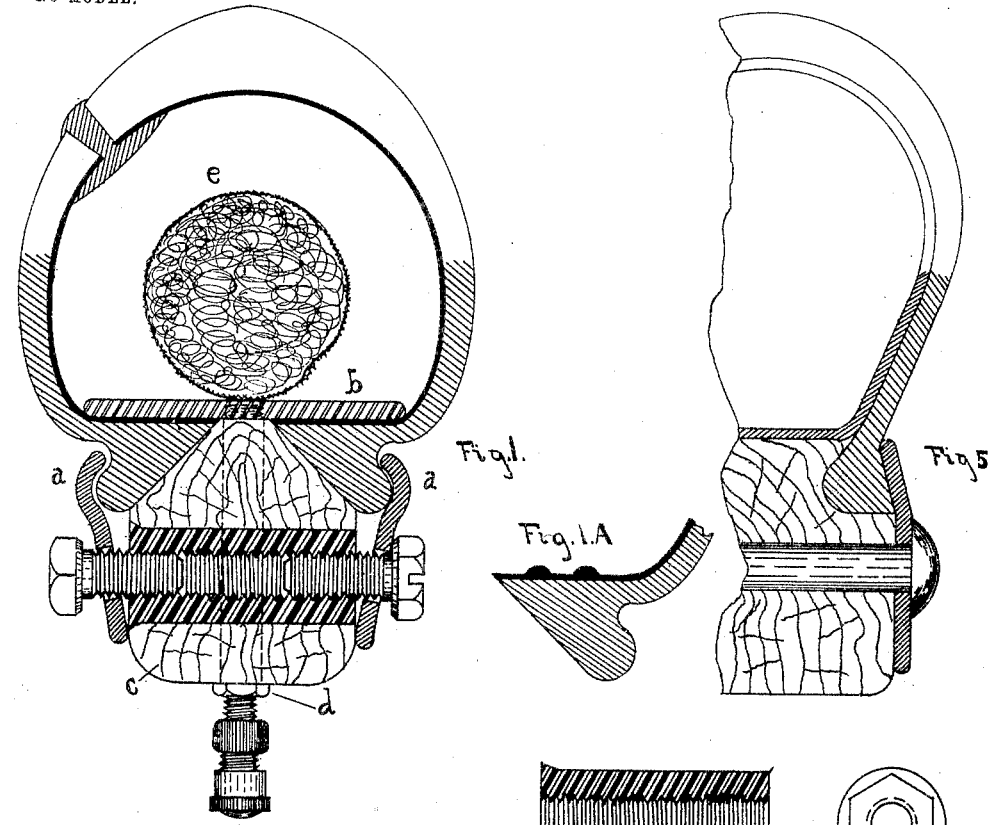
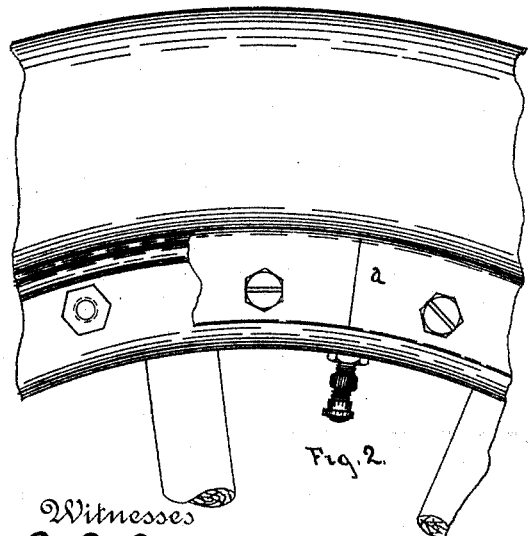
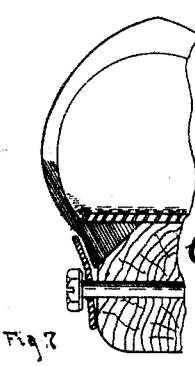
Witnesses
R. R. Bond
H. S. Bond
Inventor
Charles E. Duryea
by
E. H. Bond
Attorney No. 776,650. Patented December 6, 1904.

UNITED STATES PATENT OFFICE.

CHARLES E. DURYEA, OF READING, PENNSYLVANIA.

PNEUMATIC TIRE.

SPECIFICATION forming part of Letters Patent No. 776,650, dated December 6, 1904.

Application filed January 16, 1904. Serial No. 189,297. (No model.)

*To all whom it may concern:*

Be it known that I, CHARLES E. DURYEA, a citizen of the United States, residing at Reading, in the county of Berks and State of Pennsylvania, have invented certain new and useful Improvements in Pneumatic Tires; and I do hereby declare the following to be a full, clear, and exact description of the invention, such as will enable others skilled in the art to which it appertains to make and use the same.

My invention relates to improvements in pneumatic tires for vehicles, particularly for vehicles of the heavier class, such as carriages and automobiles, although it is applicable to lighter vehicles, such as bicycles.

The objects of this invention are to provide a tire and rim cheap to construct, easy to attach and detach, permanent in attachment when applied, and free from some objections found in other tires, such as liability to creep when partially or completely deflated. It is also free from air-tube troubles, most easy to repair, and has many other minor advantages, which will be described more fully hereinafter. I accomplish these results by the means shown in the accompanying drawings, forming part of this specification.

Figure 1 is a cross-section of the tire, showing the iron rim, which not only serves to retain the rubber tire in position, but also binds the wooden felly, as is common in ordinary carriage-wheels. It also shows the clamps and clamp-screws for binding the rubber tire in place and shows the valve and stem for inflating. Fig. 2 is a short elevation showing relation of these parts from one side. Figs. 3 and 4 are details of the nut into which the clamp-screws are threaded, while Fig. 5 is a section of a known construction shown for the purpose of comparison. Fig. 6 is a repair-plug. Figs. 7 and 1$^A$ are details of tire edge.

Similar letters refer to similar parts.

More specifically, my invention is of the class known as "tubeless" tires—that is to say, the wearing and strength-providing portion of the tire, commonly known as the "shoe" or "cover," serves to contain the air without the use of an inner air-containing tube, and this outer shoe is not an endless tube, but, like the outer shoe of tires of the detachable variety, is open along its base, as are the outer shoes of double-tube tires of the clencher and clamp varieties; and my invention consists in using such a cover and rim with suitable fastening devices as to insure retaining the air, while yet avoiding the objectionable features present in tires as heretofore used. For heavy work it is necessary that the tire should be firmly and permanently fastened in position to prevent accidental displacement of the tire with possibly disastrous results. To secure this, I provide the tire-shoe with enlarged edges adapted to positively fix the size of the section of the tire at all points and also adapted to be clamped tightly in position for the purpose of securing an air-tight joint between the edge of the tire and some portion of the iron or wood, or both, forming the wheel-rim, giving preference, of course, to a tight joint with the iron, since this is more certain to be impervious to air. If the edges are not of such shape as to give definite size to the tire, the tendency of the tire is to grow bigger at the largest points, where the strain is greatest, and yield or grow smaller at other points, producing a tire irregular in size and supporting ability. On this account the usual wedge-shaped edges are generally not suited to my purpose, by which is meant an edge similar to that shown in Fig. 5, in which the pull of the tire tends to draw the wedge out of the clamping-space.

In Fig. 1 I show a wooden felly beveled on the outer corners and bound by a flat iron rim, bearing on a small flat portion of the wooden felly at the center and providing on each side acute angles into which the edges of the tire may be forced by metal clamping-plates *a a*. This construction permits the thickened edge of the tire to be clamped immovably in position, absolutely securing an air-tight joint both between the iron rim *b* and wood felly *c*. The shape of the edge of the tire-shoe is such that no perceptible variation in position can occur, and the pull of inflation and the strain of use tend to draw the thickened edge more firmly into contact with the iron rim *b*. This contact-surface is large, insuring ample packing and preventing possibility of leakage, due to the presence of a small obstacle like a grain of sand that may accidentally get between the surfaces. The construction is such that if in any event the air should escape past the joint between the edge of the shoe and the iron tire *b* it would still be obliged to pass another long joint clamped almost equally tight between the edge of the shoe and the felly *c*, although this latter surface is open to objection as an air-retaining surface, because the pull of the tire tends to lessen the contact at this point. I use, preferably, a means of clamping permitting one side to be held independently of the other and show in Fig. 1 a nut driven through wooden felly from one side, provision being made to prevent turning in the wood, such as the use of hexagonal stock, and to prevent pulling through the wood by enlarging one end of the nut. (See Figs. 1, 3, and 4.) By this arrangement one side of the tire can be clamped tightly in position and allowed to remain so, as shown in Fig. 1. The other can be loosened and removed for purposes of repair.

It is self-evident that the flat iron rim *b* provides an excellent bearing-surface for the wheel in case the tire is removed, also an excellent bearing-surface for the tire if run deflated without removal, it being much preferable to run the tire on a broad flat surface than on the edge of any rim, even though rounding in shape. Further, the clamp *a* and the iron rim *b* bear such a relation to each other that when deflated the tire is not broken over the edge of the clamp *a* nor cut by it, as frequently happens with other rims, but is permitted to bend outward in an easy and undetrimental position, while the flattening of the tread of the tire makes the rubber more dense and tends to prevent damage when run deflated.

Although it is well known that rubber is probably the best substance for a gasket at ordinary tempertures and little difficulty need be experienced in clamping the edge of the outer shoe tightly enough against the iron tire *b* to hold the air, it is often preferable to inject within the tire a liquid or semiliquid to coat and recoat the entire inner or air-retaining surface, thus absolutely insuring a tight joint where desired and also healing automatically small punctures due to the more common agent, such as tacks, pins, and thorns. Having no inner tube, this liquid is not objectionable, and since the tire is open on its base the liquid may be removed readily to permit repairing, either by cement or by vulcanization, just as any double-tube tire-shoe of present construction is repaired. The inner liquid serves a further purpose of decided importance in connection with this type of tire. There is no inner tube to creep, cut off the valve-stem, or grind itself to pieces. There is less likelihood of damage with this form of tire, and a tack or pin projecting through the outer shoe, if depressed far enough, strikes only the iron rim *b*, doing no damage, while if the outer portion of the shoe is depressed into contact with the iron rim *b* and by continued contact is forced to slip (owing to the difference in circumferential lengths) the liquid lubricates the surfaces, making the slipping easy and without the grinding or destroying action found in non-lubricated tires under such circumstances. While I prefer a liquid or semiliquid because of the self-healing effect, the lubrication so advisable and necessary with a tire adapted to be run deflated can be secured by the use of suitable powders, such as graphite or talc or mica or other substances.

The advantage of being able to run deflated without detriment is readily apparent in emergencies like stormy weather, when shelter must be reached before repair can be made, or in the service of men like doctors, who must reach their destination before giving attention to their vehicle.

The binding-plates *a* may be continuous, forming a complete circle; but I prefer to make them in short length, with ends abutting, as shown in Fig. 2, so that by loosening two or three screws a plate may be removed, the edge of the tire withdrawn from its clamped position, and sufficient access gained to the interior to permit the passage of a wire having a plug with large head attached thereto, by which means it is possible to draw such a plug through the hole, leaving the head on the inside, and thus effectually stopping the leak. This plug may be coated with cement before being drawn in position. The inner surface of the shoe may be cleaned with a wire wrapped with fabric and saturated with cleaning liquid inserted through the hole from the outside, while the preferred shape of the plug, having a large head and a stem larger at the outer end than near its head, as shown in Fig. 6, insures that it will remain in position, thus permitting quick repairing. It may be used immediately after repair, because the pressure of the air holds the plug in position instead of tending to force it out. With a semiliquid solution inside the tire the plug may be inserted dry, depending upon the solution and the shape of the plug to absolutely prevent leakage. Of course more than one plate may be removed if a greater exposure is necessary; but practically any repair may be made without removing more than two or three plates, thus exposing possibly one-fourth the circumferential length of the tire.

The iron rim *b* is shrunk in position, just as any carriage-tire, and may be held by countersunk headed bolts or by rivets, while the valve *d* is screwed through the wooden felly into the iron rim *b*, just as any pipe-fitting. This valve may be of any well-known construction adapted to be fitted as described. I give preference, however, to a valve so constructed that the air-retaining check or its equivalent may be removed, leaving a free passage of large size, through which water or any suitable liquid, semiliquid, or powder may be introduced into the tire after clamping is completed, although, as a matter of fact, by moving one or more sections the tire can be opened at any point, if desired, and substances introduced.

It will readily be seen that the interior of this tire may be provided with an endless filler—as, for example, very soft cotton rope—which, while of light weight and not great sustaining power, would suffice to increase the buffer effect sufficiently to prevent cutting the rubber between a stone and the iron rim in case the thickness of the shoe in that particular instance is too little to properly accomplish this result. Having no internal projections, this filler could creep around inside the tire without knotting or without detriment, and the filler may be made of any material preferred or of any degree of supporting ability.

Other shapes of rims than the one shown may be used so long as the requirement that the air-retaining joints at the edges of the tire are maintained by mechanical means and not by the inflation and are tightened and made more perfect by the strain of the inflation and use rather than the reverse. I prefer to retain with any shape tire a rim, using the flat bearing-surface, which permits not only running without a tire, but gives an easy sliding surface adapted to remain readily lubricated when the tire is run deflated and does not have sharp edges, as before described. The proven value of wood wheels, wooden felly, and flat iron rims, together with their low cost, are also features to be maintained in a tire of this construction. The freedom from cutting on the edges, the fixture of one edge regardless of the other, and the absolute removal of the valve from relation to the rubber portion of the tire I prefer to preserve in any shape adopted.

In Fig. 5 is shown a known method of clamping the edge of a tire, which while it draws tighter under inflation if run deflated breaks the shoe very shortly over the clamping edge, causing damage and destroying the shoe very quickly. Other objectionable clamping devices heretofore used could be shown which are not applicable to a tire of my design, although, doubtless, well adapted to use with an inner tube, which itself prevents running deflated.

While the ordinary tire-casing if given an inner coating of rubber suffices ordinarily to hold the air properly, it is preferable that the rubber should be thicker or slightly corrugated along the edge of the tire, as shown in Fig. 1ᴬ. These corrugations being of soft rubber flatten down under pressure and insure that any roughnesses or depressions in the metal are closed and make a more effective joint than if flat rubber alone is used. While the buffer or filler may be in the shape of a rope or light cotton, it may also be a cloth tube stuffed with curled hair or other elastic buffing material, and this tube is shown at $e$ in Fig. 1.

I am aware that self-healing substances have been used in tires, particularly in single-tube tires, also that clamped tires have been made both with and without inner tubes, one form being shown in Fig. 5, also that buffers or fillers have been introduced to prevent damage in case of deflation; but these devices have all had objections which are overcome by my invention as described.

To secure the greatest service from rubber, it is advisable to work it under compression rather than tension, and tire-shoes are frequently made so that the outer wearing portion when inflated is caused by this inflation to assume a shape tending to throw the tread portion under compression. If the ordinary tire-shoe is turned inside out and a rubber sheet cemented to the inner surface while in the outside position, this rubber will be compressed and practically close all punctures when the tire is turned back to the normal position, an advantage readily applicable to my form of tire, but not applicable to tires using double tubes. From this it will be readily evident that small punctures in the inner lining, whether made integral with the tire-shoe or whether cemented thereto afterward, can more readily be found by turning the tire inside out than otherwise, a further advantage with my tire.

I claim—

1. In a pneumatic tire, a retaining-shoe, having an air-tight inner wall and thickened edges, in combination with a wooden felly having inclined surfaces upon which the said inclined edges bear, an iron rim shrunk thereon and a suitable clamp and oppositely-disposed means engaging a common device in said felly for binding the edges of the shoe against the said iron rim and drawing said edges downward against said inclined surfaces to form an air-tight joint.

2. In a pneumatic tire, a retaining C-shaped shoe having an air-tight inner retaining-wall and thickened wedge-shaped edges thinnest at the extreme edge, in combination with a wooden felly having inclined surfaces upon which the said inclined edges bear, a metallic rim, a clamp and oppositely-disposed means engaging a common device in said felly and connected with said clamp as and for the purpose set forth.

3. In a pneumatic tire, an air-retaining shoe endless but open on its base with thickened edges, tapering toward their extreme edges, in combination with a metallic rim, having a cylindrical outer surface flat in cross-section, an air-valve attached to said rim and suitable clamp for binding the edges of said tire to the inner circumference of said iron rim with the valve-stem between and clear of the tire edges.

4. In a pneumatic tire, the combination of an air-retaining shoe having thickened edges, means for clamping said edges to suitable tire and felly, consisting of clamps on opposite sides and screws passing through said clamps into a common nut fixed in said felly.

5. In combination, an endless tire-shoe open at its base and having thickened edges, an inner air-retaining lining, a metallic rim, a wooden felly having inclined surfaces upon which the edges of the shoe bear, and means other than the inflation of the tire for maintaining air-tight joints between the metal rim and the edges of the tire-shoe, said means being oppositely disposed and engaging a common device in the felly.

6. In a pneumatic tire, an air-retaining shoe, having an air-tight inner wall and thickened edges, in combination with a wooden felly having inclined surfaces upon which the inner inclined surfaces of said thickened edges bear, a metallic rim shrunk thereon, clamping means and means extending from opposite sides and connected with the clamping means and engaging a common device within the felly for forming an air-tight joint between the felly and the edges of the shoe independent of the joint formed by the clamp and the felly.

7. In a pneumatic tire, the combination of an air-retaining shoe, a felly having oppositely-inclined faces, an interposed member against which the shoe bears, and means entered from opposite sides and engaging common means within the felly for clamping the shoe between the felly and said member and drawing the edges of the shoe down upon the inclined faces of the felly and forming double air-tight joints.

8. In a pneumatic tire, an air-retaining shoe, a felly having oppositely-inclined faces, a flat member contacting with the felly and extending over the said inclined faces, and means bearing upon the edges of the shoe near the base of the said inclined faces of the felly for clamping the shoe against said inclined faces and between the same and the flat member and means passed through the clamping means from opposite sides and engaging a common device within the felly.

9. In a pneumatic tire, a felly having oppositely-inclined faces, a flat member resting upon the felly and extending over said inclined faces, means for clamping the shoe against said inclined faces and bearing upon the edges of the shoe near the base of the said inclined faces of the felly and means parallel with said flat member for drawing said clamping means and extending into the felly from opposite sides and engaging a common device therein to cause the pull of inflation and the strain of use to more firmly draw the shoe in contact with said flat member.

10. In a pneumatic tire, an air-retaining shoe, a felly having inclined faces, a flat member bearing upon the felly, a nut held in the felly, clamps and means held in the said nut and engaging the clamps and independently adjustable.

11. In a pneumatic tire, a retaining-shoe having thickened edges inclined upon their inner faces, a felly having oppositely-inclined outer faces and flat upper face, a flat member supported on said flat face, and extended over the inclined faces of the felly, the inclined faces of the edges of the shoe bearing upon the inclined faces of the felly, clamping means adjustably supported on the felly and engaging said thickened edges at points beneath the flat member and substantially opposite the mid-length of the inclined faces of the felly, and means for adjusting the clamping means and engaging common means mounted in the felly.

In testimony whereof I affix my signature in presence of two witnesses.

CHARLES E. DURYEA.

Witnesses:
NAOMI T. EVANS,
CHAS. L. FLICKINGER.